United States Patent Office 2,798,581
Patented July 9, 1957

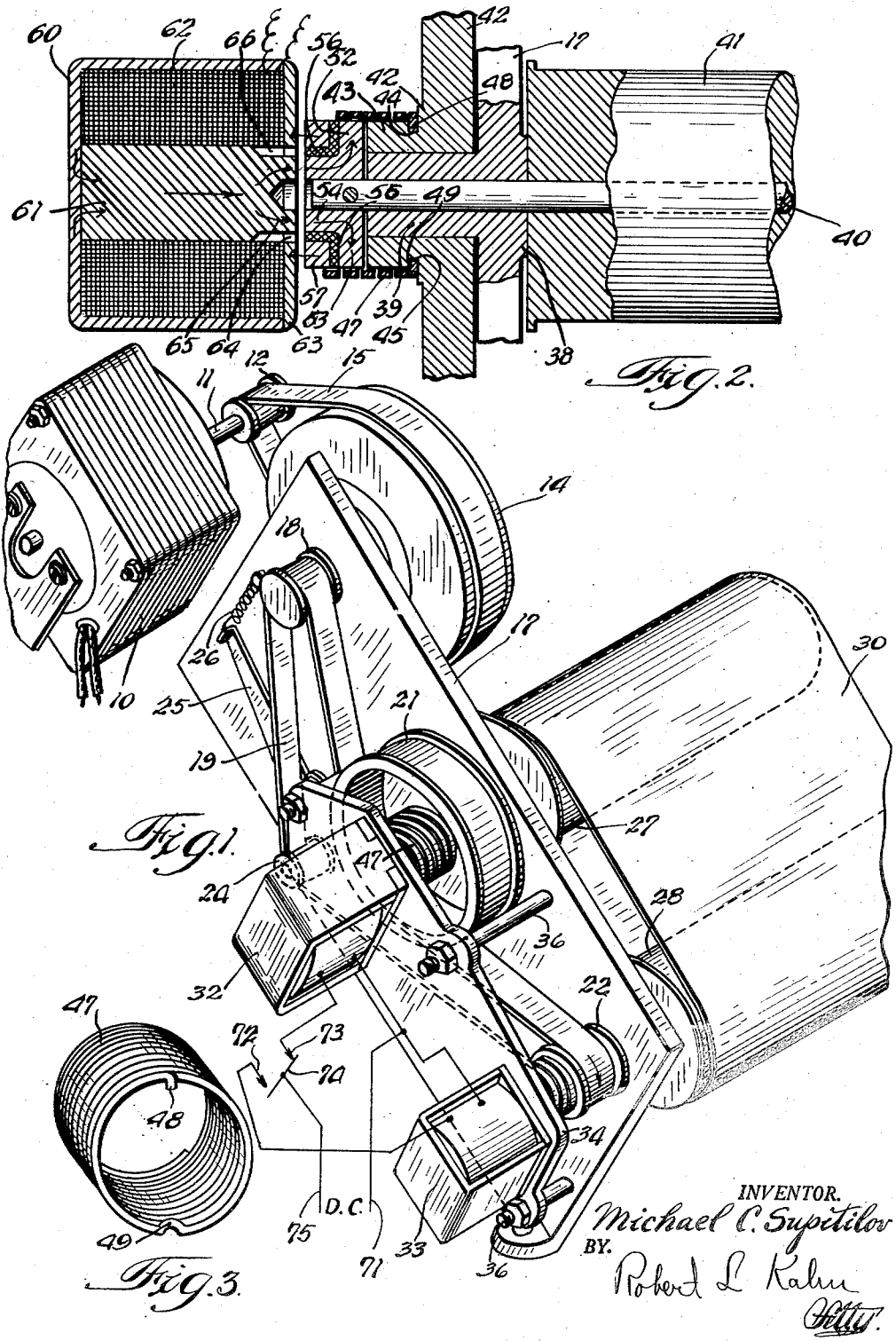

2,798,581

SOLENOID OPERATED COIL CLUTCH MECHANISM

Michael C. Supitilov, St. Charles, Ill., assignor to DuKane Corporation, St. Charles, Ill., a corporation of Illinois Application February 25, 1954, Serial No. 412,598

8 Claims. (Cl. 192—84)

This invention relates to a clutch mechanism, and particularly to a clutch mechanism wherein small amounts of electrical energy may be used to control a clutch handling any desired amount of mechanical power. The clutch forming the subject matter of the present invention is particularly useful for sound recording and sound reproducing mechanism but may be used elsewhere where mechanically simple clutch mechanism is desired. For convenience, the invention will be described in connection with a sound recording and sound reproducing machine with the understanding, however, that this is merely exemplary and that other and varied uses for a clutch embodying the present invention are possible.

The clutch forming the subject matter of the present invention is operative in only one direction of rotation and has the desirable property of engaging and disengaging without sudden mechanical shock to any mechanism. The clutch embodying the present invention utilizes a helical coil spring as the torque transmitting means between the driving and follower members of a clutch. Such a coil spring is effective for one direction of rotation only, clutch engagement involving the tightening of a normally loose spring end coil around a clutch member to provide peripheral or surface gripping by virtue of constriction of the spring. The actual driving power or torque is transmitted through the coil spring and appears as a tensile stress upon the coil spring tending to maintain the coils tightly constricted.

Clutches of the above type utilizing a coil spring are generally old. As a rule, one spring end portion is permanently anchored to a clutch member and manually controlled means are provided for selectively anchoring or restraining the other spring end portion to the remaining clutch member. The drag on the spring, tending to tighten the coils, generates a constricting force which permits torque to be transmitted through the coil spring to the driven member. Any amount of power may be handled, depending upon the size of the spring. In fact, the main portion of a helical spring may be of comparatively heavy stock while the free end turns of the spring to be controlled may be comparatively light so as to be easily flexed. Thus the last few turns of a stiff coil spring may be tapered or the metal cut out in spots so that the free end turn of such spring has increased flexibility and may be easily controlled.

In all such clutches, however, mechanical means have been used to transmit energy between relatively movable parts for operating upon the control end of the helical spring. Such mechanical means add friction to and result in wear upon the clutch mechanism.

This invention provides a clutch construction of the helical spring type wherein no mechanical means for transmitting clutch control energy between relatively movable parts is used. In accordance with the present invention, the clutch is so constructed that an electromagnetic field acting upon the control portion of the helical spring will cause the same to be anchored or restrained upon the desired clutch part and thereby permit the clutch to wind up the spring for proper clutch engagement. The disappearance of the electromagnetic field permits the clutch to restore itself to a normal inoperative disengaged condition.

The invention in its broader aspects, as well as in its more specific aspects, will be best understood by reference to the drawings wherein an exemplary embodiment is illustrated. It is understood, however, that variations of construction may be made without departing from the scope of the invention except as defined by the appended claims.

Referring, therefore, to the drawings:

Figure 1 is a perspective view of an exemplary form of drive mechanism for use in a sound recording and reproducing machine as one example, said mechanism embodying a pair of clutches embodying the present invention.

Figure 2 is an axial section of one of the clutch mechanisms used in Figure 1.

Figure 3 is a perspective view of the spring.

As previously pointed out, the invention is illustrated in connection with a simple mechanism for sound recording and sound reproducing. It is understood that other mechanisms may use one or more clutches embodying the present invention.

Referring specifically to Figure 1, motor 10 drives shaft 11 provided with pulley 12. Motor 10 may be of any suitable construction and in the case of sound recording and reproducing machines will usually be an induction motor of either single or two-phase type. Pulley 12 may be part of shaft 11 or may be separate as illustrated. Pulley 12 drives pulley 14 through belt 15. As a rule, motor 10 will be pivotally supported in a suitable manner so that the weight of the motor will maintain a constant tension upon belt 15. However, any suitable means for maintaining a constant tension may be provided. Pulley 14 has a shaft journaled in massive supporting plate 17. Plate 17 may be of steel or any desired material. The pulley shaft carries small pulley 18 driving belt 19 for providing power for the recording and reproducing mechanism.

Belt 19 in this particular instance may drive pulleys 21 and 22. These pulleys are suitably journaled in plate 17 in a manner illustrated in Figure 2 as one example. Belt 19 also engages idler pulley 24, carried by pivot arm 25, and pressed against the belt by spring 26. Pulleys 21 and 22 are adapted to drive, through their respective clutches, cylinders 27 and 28 upon which there may be disposed sound record belt 30. The sound recording and reproducing may be mechanical, such as by stylus, or may be of the magnetic type and in general forms no part of the present invention. In the apparatus illustrated in Figure 1, where two separate clutches are provided for the two record cylinders, magnetic recording and reproducing will generally be used. In the case of stylus recording and reproducing, it is necessary to have one clutch and drive the belt in one direction only. As illustrated here, however, the belt may be driven forward or reverse and at different speeds as desired.

In the specific apparatus illustrated, pulley 21 will be the pulley for driving the belt forward when recording or reproducing. Pulley 22 will be useful for driving the belt in the reverse direction. It is therefore to be understood that the illustration of two clutches does not necessarily limit the use of the mechanism to magnetic sound recording and reproducing and conversely, the fact that the apparatus illustrated may be useful for magnetic recording and reproducing does not necessarily require the use of two clutches.

In order to control the clutches associated with pulleys 21 and 22 respectively, clutches generally indicated by 32 and 33 are used. These clutches are supported on plate 34 which is bolted to plate 17 by bolts 36 at various points. In the specific apparatus illustrated, it will be readily understood that only one clutch at a time is to be engaged. However, there may be apparatus where more than one clutch is provided and where simultaneous or a certain desired pattern of clutch operation is necessary. The construction of the two clutches will be similar except for direction of wind of the springs.

Referring specifically to Figures 2 and 3, one of the clutches is shown in section. Plate 17 is provided with thrust bearing portion 38 and journal sleeve portion 39. Thrust bearing portion 38 and journal sleeve 39 are preferably integral and may be either part of or if separate from plate 17 are rigidly carried by plate 17. Rotatably journaled within journal sleeve 39 is shaft 40 which, as far as the clutch is concerned, may be considered as the driven or load member. Shaft 40 may be of soft steel or any other material and if of steel, it is preferred to have journal sleeve 39 of brass or bronze so that the bearing and the shaft will work properly. Shaft 40 carries cylinder 41 rigidly secured thereto. Cylinder 41 and thrust bearing portion 38 cooperate as a thrust bearing to limit end movement of shaft 40 to the left.

Rolling on the outside of journal sleeve 39 is driver pulley 42 having sleeve portion 43. Driver pulley 42 corresponds to either of pulleys 21 and 22 in Figure 1. Pulley 42 and sleeve 43 may be integral as shown and are preferably of non-magnetic material as brass, aluminum, certain types of stainless steel, or the like. Pulley 42 may have its outer diameter corresponding to pulley 21 or corresponding to pulley 22, as the case may be.

Sleeve portion 43 of the pulley has two diametrically opposed recesses 44 and 45 at the region where the sleeve and pulley meet. The pulley is finished at the annular part where the sleeve and pulley meet. Disposed around the outer surface of sleeve 43 is helical coil spring 47 having end 48 turned in as shown. The end coil of the spring at a point opposite to part 48 is indented at 49.

Parts 48 and 49 of the coil spring are designed to fit into recesses 44 and 45 of the pulley or driver part of the clutch. Thus the end turn of the coil spring is rotatably anchored or locked to the pulley. The trueing of the pulley side against which the end coil of spring 47 bears insures the axial alinement of the spring and sleeve portion 43. Other anchoring or locking means may be provided. Coil spring 47 is preferably of rectangular stock as illustrated in Figure 2. At least the control end of the coil spring is ferromagnetic or has a ferromagnetic part attached thereto. This ferromagnetic part may be of steel, which steel is somewhat softer than hard spring steel, so that the magnetic retentivity of the metal is less than is normal for high grade spring steel. However, hard spring steel will function effectively. The coil spring as a whole is a tension member and except for the control part, may be of any suitable material.

Coil spring 47 has a number of its coils disposed around the outside of sleeve 43. The outer diameter of sleeve 43 may be about as large or somewhat larger than the inside diameter of the coil spring in its untensioned state so that there is little, if any, clearance between the coil spring and the outer surface of sleeve 43. This will provide a tight constricting grip on sleeve 43. If this grip is tight enough, the locking parts 48 and 49 on the spring may be eliminated.

Coil spring 47 has a number of convolutions or coils extending beyond sleeve 43 and within these turns and normally clearing the same there is clutch follower member 52. Member 52 is rigidly joined to load shaft 40 as by a pin or any other suitable means. Member 52 has a generally cylindrical shape and is of composite construction. Member 52 consists of annular shouldered part 53 having reduced portion 54 extending away from the driver member.

Member 52 has annular angle piece 56 disposed on the shouldered surfaces of part 53. This annular angle piece is of non-magnetic material and may be of metal or of non-metallic material. Brass or copper may be used and soldered to parts 53. Ring 57 is disposed over the corresponding surfaces of non-magnetic spacer ring 56. Both ring 57 and annular part 53 are of ferromagnetic material, readily susceptible to magnetization but having little tendency to be permanently magnetized. These two parts of follower member 52 may be of soft iron or soft steel, for example. As may be readily appreciated, if means are provided for tightening one or more coils of spring 47 around driven clutch member 52, then a power drive through the coil spring will be established in the direction tending to tighten the coil spring.

Driven member 52, consisting of magnetizable part 53, non-magnetic annular angle spacer 56, and magnetizable ring 57, is rigidly united as by soldering or by press fit and is preferably finished off smoothly to provide a generally cylindrical construction as shown. As shown in Figure 2, coil spring 47 overlies driven member 52 far enough so that at least part of a turn extends over non-magnetic spacer portion 56.

The thickness of the non-magnetic part, at least in the neighborhood of the coil spring, is of about the same order as the width of the coil spring stock along the surface of the cylindrical surface. The width of the spring wire may be somewhat greater than the thickness of the non-magnetic spacer underneath it so that at least part of a turn of the wire will bridge the non-magnetic gap between parts 53 and ring 57 of the driven member.

The advantage of rectangular spring wire will now be apparent for the reason that a snug fit between the surface of the wire and the surface of the driven member at the non-magnetic gap will be possible. Furthermore by having the non-magnetic spacer material narrower than the width of spring wire, there will be less tendency to wear down the non-magnetic material faster than the adjacent iron or steel parts due to any spring slippage.

Stationary means are provided for creating a magnetic field having a tendency to cross the non-magnetic gap. As illustrated in Figure 2, an electromagnet, generally resembling, on a small scale, the magnet construction of an electrodynamic speaker system, is provided. This consists of U part 60 having center post 61 extending from the bottom of the U toward the front. Winding 62 is around the post. Plate 63 is provided for bridging the U arms, this plate having a round opening 64 cooperating with the recessed end of post 61 functioning as pole piece 65. A pot may be used instead of U part 60.

The electro-magnet structure is stationary and is maintained clear of the end face of the driven member by a small distance. The separation illustrated in Figure 2 is greatly magnified and in practice, the gap will be of the order of but a few thousandths of an inch. Annular gap 66, formed at the electro-magnet between apertured front plate 63 and pole piece 65, is designed to have about the same dimensions as the opposed end of the annular nonmagnetic angle spacer member in the driven part of the assembly. By proper design of the various magnetic and non-magnetic parts of the driven or follower part 52 of the clutch, excitation of the winding will result in a magnetic field being created. The magnetic lines of force will follow generally as indicated by arrow. Beginning with post 61, the lines of force will go to the annular pole piece 65, across the air gap to ferromagnetic part 54, thence along shouldered part 53 through an air gap to the control part of the coil spring, then back into annular ring 57, across the air gap to plate 63, then along the U arms and bottom back to post 61. This path is the working flux path. Some leakage flux will go elsewhere. The polarity of the magnetic field is unimportant. The ferromagnetic control portion of the helical spring will therefore be drawn in toward the edge of non-magnetic spacer 56. Various shapes of non-magnetic spacers may be provided. Thus in Figure 2, the spacer is angle shaped.

Instead, it may be tapered to provide the minimum non-magnetic gap right under the spring control portion.

Direct or pulsating current is preferred for exciting the winding. Where the spring steel is hard and tends to substantial permanent magnetization, it may be necessary to have more stiffness on the control portion so that the permanent field will not be strong enough to maintain the clutch in engaged position.

Follower or load shaft 40 may end short of the end face of the driven member. The recessed end of center post 61 will tend to concentrate the magnetic lines of force to the desired driven member parts. Thus a magneto-motive force at the free end face of the follower member will induce a desired magnetic induction. The opposed recesses in the shaft end and post 61 may be filled with some non-magnetic material.

The electromagnet for creating the magnetic field may be secured in any suitable fashion. As illustrated in Figure 1, two such electromagnetic means forming parts of two clutches are provided. The two electromagnets are supported on auxiliary base plate 34 which is bolted or suitably attached to plate or base 17.

The various parts of the electromagnet structure will be of soft iron or soft steel.

In the construction illustrated in Figure 1 where two clutches are provided with the followers travelling in opposite directions, it is essential that only one clutch be energized at any one time. To this end, the windings of the two clutches may be connected as shown. Thus one terminal of each winding is connected to wire 71 of a suitable source of direct current. The remaining terminals of the windings are connected to contacts 72 and 73 respectively of switch 74, the movable contact of which is connected to wire 75 going to the direct current source. Switch 74 is so arranged that the movable contact will have three stable positions, one position where both contacts are open and the remaining two positions where either of the remaining contacts are closed.

What is claimed is:

1. In a clutch of the type having aligned cylindrical driver and driven clutch members with a helical tension member disposed over both clutch members and said clutch being operative for one direction of rotation only when the ends of said helical member are retained against the outer surfaces of said clutch members for effecting constriction of said helical member about said clutch members, the improvement comprising a flexible ferromagnetic control portion forming an end part of said helical member and overlying a portion of said driven clutch member, said last-named driven clutch member portion extending axially away from the driver clutch portion to an end face of the driven clutch portion and including a pair of annular ferromagnetic parts having an annular non-magnetic gap therebetween, the ferromagnetic parts being substantially free of permanent magnetization and being shaped so that the ferromagnetic parts extend continuously from the cylindrical surface of the driven clutch member to the end face thereof and being dimensioned so that the annular non-magnetic gap extends continuously from the cylindrical surface of said driven clutch portion radially inwardly and axially away from the driver portion to the end face of the driven portion and manually controlled stationary means in proximity to the end face of said driven member for creating a magnetic field in said spaced ferromagnetic parts, said field extending between the end face of the driven member along the ferromagnetic portions to the ferromagnetic helical control portion to draw said control portion against said driven member for initiating clutch action.

2. The construction according to claim 1 wherein said helical tension member has means for rotatively locking two diametrically spaced points on the end turn of said helical member overlying the driver helical member whereby axial alignment of the member with respect to the clutch members is maintained at all times.

3. In a clutch of the type having aligned cylindrical driver and driven clutch members with a helical spring disposed over both clutch members, said clutch being operative for one direction of rotation when the ends of said spring are retained against the outer surfaces of said clutch members so that the spring is constricted around said clutch members, the improvement comprising a ferromagnetic resilient control portion for the one end of said spring overlying said driven clutch member, means for rotatively locking the other end of said spring to said driver clutch member at a number of points symmetrically disposed around the axis of said spring, said driven member comprising an annular stepped ferromagnetic member having a reduced portion extending toward the end face of said driven member, an annular ferromagnetic ring disposed over said reduced portion, non-magnetic means separating said last two named members to provide an annular non-magnetic gap extending from the end face of said driven member inwardly and outwardly to the cylindrical surface of said driven member on a part beneath the control portion of said spring, stationary means in proximity to the end face of said driven member for creating a magneto-motive force in said two ferromagnetic driven parts so that lines of magnetic force extend across the gap at the cylindrical surface of said driven member so that the ferromagnetic control portion of said spring is attracted to said driven member surface for clutching.

4. The construction according to claim 3 wherein said stationary means includes an electromagnetic means having an annular non-magnetic gap for creating a magnetic field having opposite polarities in the two ferromagnetic driven clutch member portions.

5. The construction according to claim 4 wherein the spacing between the stationary member and the end face of the driven clutch member is less than the gap between the two ferromagnetic parts of said driven member.

6. In a clutch of the type having aligned cylindrical driver and driven clutch members with a helical tension member disposed over both clutch members and said clutch being operative for one direction of rotation only when the ends of said helical member are retained against the outer surfaces of said clutch members for effecting constriction of said helical member about said clutch members, the improvement comprising a flexible ferromagnetic control portion forming part of said helical member and overlying a portion of said driven clutch member, said last-named clutch member portion extending axially away from the driver portion to an end face of the driven portion and including a pair of annular ferromagnetic parts having an annular non-magnetic gap therebetween, the ferromagnetic parts being substantially free of permanent magnetization and being shaped so that each ferromagnetic part extends continuously from the cylindrical surface of the driven member to the end face thereof and being dimensioned so that the annular non-magnetic gap extends continuously from the cylindrical surface of said driven clutch portion beneath at least part of said helical control portion radially inwardly and axially away from the driver portion to the end face of the driven portion, manually controlled stationary means in proximity to the end face of said driven member for creating a magnetic field in said spaced ferromagnetic parts, said field extending between the end face of the driven member along the ferromagnetic portions to said ferromagnetic helical control portion to draw said control portion against said driven member for initiating clutch action, said clutch driver part having a stationary sleeve type journal, said journal and clutch driven member having alined bores to accommodate a driven shaft, a shaft disposed within said clutch driven member and journal and having a part beyond said journal with a load on said shaft, means for coupling said shaft to said clutch driven member and thrust bearing between said journal and shaft load.

7. In a clutch of the type having aligned cylindrical driver and driven clutch members with a helical spring disposed over both clutch members, said clutch being operative for one direction of rotation when the ends of said spring are retained against the outer surfaces of said clutch members so that the spring is constricted around said clutch members, the improvement comprising a ferromagnetic resilient control portion for the one end of said spring overlying said driven clutch member, means for rotatively locking the other end of said spring to said driver clutch member at a number of points symmetrically disposed around the axis of said spring, said driven member comprising an annular stepped ferromagnetic member having a reduced portion extending toward the end face of said driven member, an annular ferromagnetic ring disposed over said reduced portion, non-magnetic means separating said last two named members to provide an annular non-magnetic gap extending from the end face of said driven member inwardly and outwardly to the cylindrical surface of said driven member on a part beneath the control portion of said spring, stationary means in proximity to the end face of said driven member for creating a magneto-motive force in said two ferromagnetic driven parts so that lines of magnetic force extend across the gap at the cylindrical surface of said driven member so that the ferromagnetic control portion of said spring is attracted to said driven member surface for clutching, said clutch driver part having a stationary sleeve type journal, said journal and clutch driven member having alined bores to accommodate a driven shaft, a shaft disposed within said clutch driven member and journal and having a part beyond said journal with a load on said shaft, means for coupling said shaft to said clutch driven member and thrust bearing between said journal and shaft load.

8. The construction according to claim 7 wherein said stationary means includes an electromagnetic means having an annular non-magnetic gap for creating a magnetic field having opposite polarities in the two ferromagnetic driven clutch member portions.

References Cited in the file of this patent

UNITED STATES PATENTS

| | | |
|---|---|---|
| 839,786 | Sester | Dec. 25, 1906 |
| 1,886,692 | Kapitza et al. | Nov. 8, 1932 |
| 1,953,370 | Starkey | Apr. 3, 1934 |
| 2,356,421 | Morse | Aug. 22, 1944 |
| 2,596,654 | Clark et al. | May 13, 1952 |
| 2,622,450 | Gorske et al. | Dec. 23, 1952 |